UNITED STATES PATENT OFFICE.

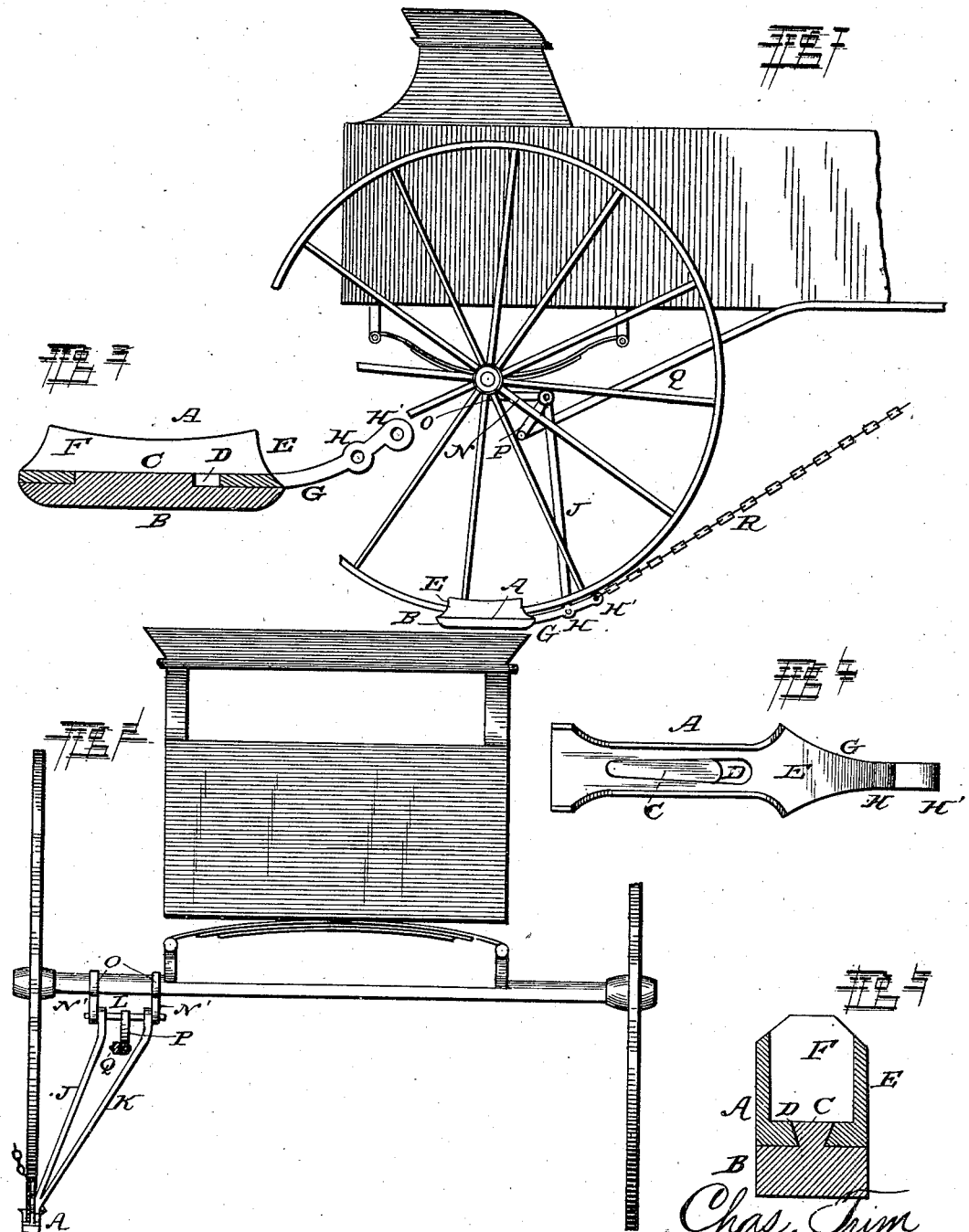

CHARLES TRIM, OF HOUGHTON, MICHIGAN, ASSIGNOR OF ONE-HALF TO GEORGE P. McFARLANE, OF SAME PLACE.

DRAG-BRAKE FOR VEHICLES.

SPECIFICATION forming part of Letters Patent No. 305,487, dated September 23, 1884.

Application filed May 28, 1884. (No model.)

*To all whom it may concern:*

Be it known that I, CHARLES TRIM, a citizen of the United States, residing at Houghton, in the county of Houghton and State of Michigan, have invented a new and useful Drag-Shoe or Brake for Vehicles, of which the following is a specification, reference being had to the accompanying drawings.

This invention has relation to drag-shoes or brakes for vehicles; and it consists in the construction and novel arrangement of parts, as will be hereinafter fully described, and particularly pointed out in the claim.

Figure 1 is a side elevation of a portion of a vehicle with my improved drag-shoe or brake applied. Fig. 2 is a front elevation of the same. Fig. 3 is a vertical longitudinal sectional view of the drag-shoe. Fig. 4 is a plan view of the drag-shoe, and Fig. 5 is a transverse vertical sectional view of the brake-shoe.

Referring by letter to the accompanying drawings, A designates the drag-shoe, the shoe B of which is provided with a dovetail tongue, C, which fits in a dovetail groove, D, in the drag E, in order that when the shoe has been worn too much for further use it may be removed and replaced by a new shoe, thus enabling me to prolong the usefulness of the drag. The drag E is provided with an elongated seat, F, in which the rim of the wheel rests when the drag or brake is put on. The drag is provided with a tongue, G, having at its forward end an eye, H, and an eye, H', one in front of the other. The eye H is connected by a pivot-bolt to the lower ends of the outwardly-inclined rods J K. These rods J and K diverge from their connecting-points with the tongue of the drag toward the axle, and are rigidly connected at their inner ends to a short horizontal rod, L, having its bearings in the forwardly-extending horizontal arms N N' of a bracket, O, clipped to the axle of the vehicle just outside of the vertical line of the body of the vehicle, as shown in Fig. 2. The short horizontal rod L is provided with a downwardly and rearwardly extending arm, P, to the lower end of which is pivoted the lower end of the operating-lever Q, which extends forwardly up along the side of the vehicle-body to within easy reach of the driver's seat, where it engages a suitable rack. The forward eye, H', is provided with a chain, R, which also extends up to the driver's seat. This provision is made for certain classes of vehicles in which a lever could not be conveniently used.

When not in use, the drag is drawn up and suspended from the side of the vehicle by the chain R, which engages a hook supplied for the purpose.

The drag can be put on the wheel and taken off again by the driver from his position in his seat.

The drag-shoe is applied to one of the rear wheels of the vehicle.

It is cheap, durable, and economical, as the shoe can be cheaply replaced when worn out.

The drag is made of malleable iron, the shoe of cast-iron, and the mechanism for connecting them to the vehicle is made of wrought-iron.

Having thus fully described my invention, what I claim as new, and desire to secure by Letters Patent of the United States, is—

The combination, with the drag E, having tongue G, provided with eyes H H', and wheel-seat F, and dovetail groove D, and the shoe B, having dovetail tongue C, of the diverging inclined rods J and K, pivoted to the eye H, and rigidly connected to the short rod L in the arms N N' of the bracket O, clipped to the axle, the arm P of the rod L, and the operating-lever and chain, substantially as specified.

In testimony that I claim the foregoing as my own I have hereto affixed my signature in presence of two witnesses.

CHARLES TRIM.

Witnesses:
JOHN W. RICE,
THOS. D. MEADS.